2,866,713
Patented Dec. 30, 1958

United States Patent Office

2,866,713

VITREOUS PHOSPHATE ENAMELS AND THEIR USE

Robert P. Allen, Aiken, S. C., assignor to E. I. du Pont de Nemours and Company, Wilmington, Del., a corporation of Delaware No Drawing. Application April 3, 1956
Serial No. 575,719

14 Claims. (Cl. 106—48)

This invention relates to vitreous phosphate enamels having particular utility for the enameling of aluminum and aluminum-rich alloys. By "aluminum-rich alloys" is meant alloys of aluminum containing at least 80% by weight of aluminum.

This application is a continuation-in-part of my copending application Serial No. 217,079, filed March 22, 1951, now abandoned.

The difficulty of enameling aluminum and aluminum-rich alloys with a vitreous enamel is well known. Whereas other metals such as copper and steel have been enamelled with vitreous enamels for a great many years, the vitreous enameling of aluminum has been commercially successful only since the invention of Deyrup as described in U. S. Patent No. 2,467,114.

The enamels of Deyrup contain a high percentage of lead. In view of public opposition to the use of lead-containing enamels on food-handling equipment, a non-lead-containing enamel for aluminum has for some time been urgently required.

It is an object of this invention to provide a non-lead-containing vitreous enamel for use in enameling aluminum and aluminum-rich alloys.

It is another object of this invention to provide a process for enameling aluminum and aluminum-rich alloys with lead-free vitreous enamel suitable for use in producing food-handling utensils and equipment.

It is yet another object of this invention to provide aluminum and aluminum-rich alloys having a securely bonded coating of a lead-free vitreous enamel.

Other objects will appear hereinafter. The objects of this invention may be accomplished, in general, by the preparation of a lead-free vitreous enamel frit having a firing and maturing temperature of between 500° and 580° C. and containing as essential ingredients $P_2O_5$, $Al_2O_3$, $Na_2O$ and $TiO_2$.

These essential ingredients must be present in the enamel frit within the following ranges, expressed in weight percentages:

| | Percent |
|---|---|
| $P_2O_5$ | 39–51 |
| $Al_2O_3$ | 15–32 |
| $Na_2O$ | 18–26 |
| $TiO_2$ | 2.3–5.5 |

In addition to the above-named essential ingredients the vitreous enamel frit can advantageously contain minor amounts of the following ingredients:

| | Percent |
|---|---|
| $B_2O_3$ | 0–8 |
| $K_2O$ | 0–15 |
| $Li_2O$ | 0–3.5 |
| $ZrO_2$ | 0–4 |

The total alkali metal oxides of the composition should contain between 25% and 35%, and the total of all of the above-mentioned ingredients should constitute at least 90% of the vitreous enamel frit.

The above are compositions for the melted glasses, i. e., frits, which are prepared by fusing together a mixture of raw materials which yield the above oxide constituents during the fusion operation. The oxides themselves can be employed as raw materials, as can also any other materials such as ammonium salts, carbonates and nitrates which break down to the oxides on heating during the fusion operation.

Although not essential, the presence of $B_2O_3$ in the present glasses is advantageous since it increases the fluidity of the molten composition and lowers considerably the gloss temperature. Thus, when 5% $B_2O_3$ is added to a glass containing 40% $Na_2O$, 30% $Al_2O_3$ and 30% $P_2O_5$, the gloss temperature is reduced about 20° C. The presence of too much $B_2O_3$, however, reduces resistance to citric acid and impairs the gloss of the finished product.

Potassium oxide, when substituted for part of the $Na_2O$, also reduces gloss temperature and imparts greater softness. Excessive amounts of $K_2O$, however, are disadvantageous in that they increase water sensitivity. If all the $Na_2O$ in a glass of the above formula is replaced by $K_2O$, the resulting glass is hydrolyzed by water with evolution of considerable heat.

The presence of minor amounts of $TiO_2$ as a melted-in constituent improves the citric acid resistance and aids in producing a white enamel when $TiO_2$ is employed as the opacifying agent. A glass containing 42.8% $P_2O_5$, 25.6% $Al_2O_3$, 18.7% $Na_2O$, 9.4% $K_2O$ and 3.5% $B_2O_3$ is Class A to Class AA by the test procedure of the Porcelain Enamel Institute, Products Standards Section, published in April 1940. This glass, when prepared with 2.3% $TiO_2$ added as a melted-in ingredient, tests in Class AA and gives a better white. Since $TiO_2$ raises the softening point of the glass, the amount which can be added advantageously is limited, in view of which it will generally be employed in minor amounts. The above glass containing 2.3% $TiO_2$ fires to a high gloss at 520° C. when applied to aluminum. A similar glass containing 5.5% $TiO_2$ when applied to aluminum and fired gave only a fair gloss at 560° C. which is near the upper practical firing limit for aluminum enameling operations.

The presence of $ZrO_2$ and/or $Li_2O$ improves resistance to soap and detergent solutions. Here again, but minor amounts should be used since large amounts are disadvantageous. Thus, an excess of $ZrO_2$, e. g., more than about the maximum indicated above gives a glass which is too hard and melts with difficulty while an excess of $Li_2O$ results in loss of chemical resistance.

Whether or not any of the above oxides will be included will depend upon the properties desired in the final product. Thus, $ZrO_2$ and/or $Li_2O$ will be included if maximum resistance to soaps and detergents is desired but otherwise are preferably omitted. Preferred amounts for increasing resistance to soaps and detergents are 1% to 4% $ZrO_2$ and 1% to 3.5% $Li_2O$. If products having a coefficient of expansion near or substantially equal to that of aluminum are desired, $B_2O_3$ should be omitted entirely or be present in amounts not exceeding about 2.5%, i. e., from 0 to 2.5%. However, when coefficient of expansion is not of prime importance, a $B_2O_3$ content of at least 3%, preferably 3% to 8%, is distinctly advantageous.

Minor amounts of constituents other than those above including normal impurities may also be present and may at times be desirable, but the ranges of the essential constituents should be substantially as set forth. The present glasses are essentially silica-free, i. e., will contain not more than 2% $SiO_2$. Amounts in excess of about 2% are incompatible, resulting in the formation of a separate $SiO_2$ phase. Amounts up to about 2% have no known beneficial effect but can be tolerated.

The present glasses are useful for the porcelain enameling of aluminum and aluminum-rich alloys to provide protective coatings therefor. Their degree of usefulness for this purpose will vary somewhat with their compositions. The preferred compositions indicated above are low fusion point glasses with gloss temperatures in the range 480° C. to 540° C.

The present glasses are useful for the vitreous enameling of aluminum and aluminum-rich alloys to provide protective coatings therefor. They produce enamels which have excellent gloss and excellent adherence to aluminum and aluminum-rich alloys, i. e., alloys containing at least 80% aluminum and from around 1% to 20% by weight of alloying ingredients such as manganese, magnesium, copper, chromium, zinc and silicon. Their chemical resistance is good both towards acids and materials such as soaps and detergents. They are less expensive than the lead-containing glasses heretofore used in enameling operations and, being lead-free, can be used safely for the enameling of food-handling equipment.

In preparing enamel frits from the present glasses, the glass batch ingredients are mixed together, heated until the mix is completely melted to a homogeneous glass which is then fritted by running it into water which shatters it into small pieces. The frit is freed of water by low temperature drying, usually at a temperature of around 150° C. or less. The frit is then ground in a ball mill or other mill with water or other liquids as desired. During the grinding, ceramic pigments including opacifying agents, such as $TiO_2$, and coloring pigments, such as cobalt aluminate blue and others as are commonly used in enamels, will generally be added in amounts up to about 10% of the weight of the total enamel composition. A small amount of phosphoric acid is also advantageously added. If a clear enamel is desired, opacifying agents will, of course, be omitted.

The resulting dispersion of the powdered enamel in a vehicle such as water may then be applied by any desired method to the surface to be enamelled such as the surfaces of an aluminum or aluminum-rich alloy article. The coated article will then be fired in order to fuse the powdered enamel to a continuous glossy coating. Firing conditions are not critical except that temperatures must be used which are high enough to fuse the enamel but not high enough to injure the metal article. It is ordinarily inadvisable when enameling aluminum to employ temperatures above about 580° C. and temperatures within the range of about 500° to 560° C. are generally preferred.

The surfaces of aluminum or aluminum-rich alloys to be enamelled should be clean, and when aluminum alloy surfaces are involved they preferably will be pretreated according to the method described in Deyrup and Peterson U. S. Patent No. 2,544,139. This pretreatment involves treating the alloy surfaces with an alkaline aqueous solution of a chromate, followed by a heat treatment at a temperature between 350° C. and the heat tolerance limit of the alloy, usually about 600° C.

The invention is further illustrated by the following examples.

*Example I*

A dry mixture of 493 grams of mono-ammonium phosphate, 334 grams of alumina hydrate and 303 grams of sodium carbonate was melted together in a fire clay crucible at approximately 1300° C. for one hour to produce a glass having the following composition expressed in weight percentages: 25.3% $Na_2O$, 31.2% $Al_2O_3$, and 43.5% $P_2O_5$. The molten glass was fritted by pouring it into water. After drying at about 80° C., 300 grams of the resulting frit was milled with 130 cc. of water and 2 cc. of 85% (by weight) $H_3PO_4$ for two hours in a one-gallon ball mill with seven pounds of pebbles. The enamel slip produced was sprayed onto test pieces of aluminum alloy 61 (containing 0.25% Cu, 0.6% Si, 1.0% Mg, and 0.25% Cr, by weight, the balance being Al) in amounts corresponding to a weight of 20 grams of enamel per square foot of test piece. Prior to coating the test pieces, they were pretreated according to the method of the Deyrup and Peterson patent referred to above. Each test piece was a sheet 2.5 inches by 3.5 inches. Individual test pieces coated with the enamel slip failed to give an adherent coating when fired for seven minutes at either 520° C. or 540° C. However, firing at 560° C. for seven minutes resulted in coatings which were adherent and possessed some gloss.

*Example II*

A glass was prepared by dry mixing 338 grams of mono-ammonium phosphate, 191 grams of alumina hydrate, 156 grams of sodium carbonate, 80.6 grams of 85% (by weight) potassium carbonate, 30.2 grams of boric acid, and 12.0 grams of titanium dioxide, and melting together the resulting mixture for one-half hour at 1300° C. The composition of the resulting glass was: 18.25% $Na_2O$, 9.24% $K_2O$, 25.0% $Al_2O_3$, 41.65% $P_2O_5$, 3.41% $B_2O_3$, and 2.42% $TiO_2$ (in mol percent, 29.1% $Na_2O$, 9.7% $K_2O$, 24.2% $Al_2O_3$, 29.1% $P_2O_5$, 4.9% $B_2O_3$, and 3% $TiO_2$). The glass was fritted, dried and milled and the resulting enamel slip was spray coated on aluminum alloy 61 test pieces as described in Example I. In this case, a seven-minute firing at 500° C. gave an adherent enamel coating, but the coating had poor gloss. However, when fired for seven minutes at either 520° C. or 540° C., adherent enamel coatings having a high gloss resulted.

*Example III*

A glass containing 48.2% $P_2O_5$, 21.7% $Al_2O_3$, 18.5% $Na_2O$, 9.2% $K_2O$, and 2.4% $TiO_2$ (in mol percent, 34.8% $P_2O_5$ 21.8% $Al_2O_3$, 30.4% $Na_2O$, 10% $K_2O$, and 3% $TiO_2$) was prepared following the general method of the above examples. After fritting, drying and milling the glass, the resulting enamel slip was spray coated on aluminum alloy 61 test pieces which were then fired at about 540° C. to give a glossy enamel coating. The coefficient of expansion of the enamel coating was substantially identical with that of the aluminum alloy and the resulting thin enamelled pieces exhibited no tendency to warp.

*Example IV*

An enamel slip was prepared by milling together 150 grams of the glass of Example II, 60 cc. of water, 1 cc. of 85% (by weight) orthophosphoric acid and 9.0 grams (6.0% of the weight of the frit) of a cobalt silicate blue pigment. The resulting slip was sprayed onto aluminum alloy 61 and the coated articles fired as in Example II to provide aluminum alloy test pieces having an excellent glossy blue enamel coating thereon.

*Example V*

A glass was prepared from a glass batch containing mono-ammonium phosphate, alumina hydrate, sodium carbonate, potassium carbonate, boric acid, titanium dioxide, and zirconium oxide in such amounts that the resulting glass had the following composition: 40.8% $P_2O_5$, 20.8% $Al_2O_3$, 20.8% $Na_2O$, 9.9% $K_2O$, 3.7% $B_2O_3$, 2.5% $TiO_2$, and 1.5% $ZrO_2$ (in mol percent, 24% $P_2O_5$, 24% $Al_2O_3$, 32% $Na_2O$, 10% $K_2O$, 5% $B_2O_3$, 3% $TiO_2$, and 2% $ZrO_2$). The resulting glass, when employed to enamel aluminum alloy 61 in the manner described in the foregoing examples, gave an enamel coating which was substantially more resistant to attack by soaps and synthetic detergents than the same glass except for the omission of $ZrO_2$.

*Example VI*

A glass was prepared in the manner described in the above examples employing in the glass batch mono-ammonium phosphate, aluminum hydrate, sodium carbonate, boric acid, titanium dioxide, and lithium oxide in such proportions as to give a glass of the following composition: 39.1% $P_2O_5$, 28.1% $Al_2O_3$, 22.8% $Na_2O$, 3.9% $B_2O_3$, 2.7% $TiO_2$, and 3.4% $Li_2O$ (in mol percent, 24.6% $P_2O_5$, 24.6% $Al_2O_3$, 32.8% $Na_2O$, 5% $B_2O_3$, 3% $TiO_2$, and 10% $Li_2O$). When this glass was used to enamel aluminum alloy 61 in the manner previously described, the resulting enamel coating was found to be markedly more resistant to soaps and synthetic detergents than a similar glass containing no $Li_2O$.

The preferred vitreous enamel compositions of the present invention include the compositions of Examples II, III, V and VI and encompass the following range of ingredients by weight: 39.1–48.2% $P_2O_5$, 20.8–28.1% $Al_2O_3$, 18.25–22.8% $Na_2O$, 2.4–2.7% $TiO_2$, and, of course, 0–8% $B_2O_3$, 0–15% $K_2O$, 0–3.5% $Li_2O$, and 0–4% $ZrO_2$.

Because the present glass and enamel compositions are lead-free they are particularly useful for the enameling of objects which are to be contacted with food, e. g., aluminum and aluminum alloy food-handling equipment and surfaces. Moreover, these enamel frits are outstanding with respect to their coefficients of expansion which are near or substantially identical with that of aluminum and aluminum alloys. Because of this unique property, such glasses can be employed to enamel aluminum whereby aluminum enamelled articles such as thin sheets and the like can be prepared which are not subject to warping.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A lead-free vitreous enamel frit suitable for use as a protective coating on the surface of aluminum and aluminum-rich alloys, having a firing and maturing temperature of between 500° and 580° C. and which consists essentially of

| | Percent by weight |
|---|---|
| $P_2O_5$ | 39.1–48.2 |
| $Al_2O_3$ | 20.8–28.1 |
| $Na_2O$ | 18.25–22.8 |
| $TiO_2$ | 2.4–2.7 |
| $B_2O_3$ | 0–8 |
| $K_2O$ | 0–15 |
| $Li_2O$ | 0–3.5 |
| $ZrO_2$ | 0–4 | in which the total alkali metal oxide content is between 25% and 35%, and the total of all said ingredients constitutes at least 90% of said frit.

2. A vitreous enamel frit as defined in claim 1 containing between 1% and 4% $ZrO_2$.

3. A vitreous enamel frit as defined in claim 1 containing 1% to 3.5% $Li_2O$.

4. A vitreous enamel frit as defined in claim 1 containing 3% to 8% $B_2O_3$.

5. A vitreous enamel frit as defined in claim 1 containing admixed therewith up to 10% by weight of a ceramic pigment.

6. Aluminum and aluminum-rich alloy articles having a protective coating comprising a vitreous enamel having a firing and maturing temperature of between 500° and 580° C. and consisting essentially of

| | Percent by weight |
|---|---|
| $P_2O_5$ | 39.1–48.2 |
| $Al_2O_3$ | 20.8–28.1 |
| $Na_2O$ | 18.25–22.8 |
| $TiO_2$ | 2.4–2.7 |
| $B_2O_3$ | 0–8 |
| $K_2O$ | 0–15 |
| $Li_2O$ | 0–3.5 |
| $ZrO_2$ | 0–4 | in which the total alkali metal oxide content is between 25% and 35%, and the total of all said ingredients constitutes at least 90% of said enamel.

7. Aluminum and aluminum-rich alloy articles having a protective coating as defined in claim 6 containing between 1% and 4% $ZrO_2$.

8. Aluminum and aluminum-rich alloy articles having a protective coating as defined in claim 6 containing between 1% and 3.5% $Li_2O$.

9. Aluminum and aluminum-rich alloy articles having a protective coating as defined in claim 6 containing between 3% and 8% $B_2O_3$.

10. The process for applying a protective coating on the surface of aluminum and aluminum-rich alloys which comprises fusing thereon a vitreous enamel, having a firing and maturing temperature between 500° and 580° C. and consisting essentially of

| | Percent by weight |
|---|---|
| $P_2O_5$ | 39.1–48.2 |
| $Al_2O_3$ | 20.8–28.1 |
| $Na_2O$ | 18.25–22.8 |
| $TiO_2$ | 2.4–2.7 |
| $B_2O_3$ | 0–8 |
| $K_2O$ | 0–15 |
| $Li_2O$ | 0–3.5 |
| $ZrO_2$ | 0–4 | in which the total alkali metal oxide content is between 25% and 35%, and the total of all said ingredients constitutes at least 90% of said enamel.

11. The process as defined in claim 10 in which the vitreous enamel contains between 1% and 4% $ZrO_2$.

12. The process as defined in claim 10 in which the vitreous enamel contains between 1% and 3.5% $Li_2O$.

13. The process as defined in claim 10 in which the vitreous enamel contains between 3% and 8% $B_2O_3$.

14. The process as defined in claim 10 in which the vitreous enamel contains up to 10% ceramic pigment.

References Cited in the file of this patent

UNITED STATES PATENTS

| 2,227,082 | Grimm et al. | Dec. 31, 1940 |
| 2,576,916 | Beals et al. | Dec. 4, 1951 |
| 2,608,490 | Donahey | Aug. 26, 1952 |
| 2,800,414 | Stradley | July 23, 1957 |

FOREIGN PATENTS

| 697,827 | Great Britain | 1953 |
| 718,132 | Great Britain | 1954 |
| 1,052,227 | France | 1953 |